(12) United States Patent
Fukai

(10) Patent No.: US 11,471,788 B2
(45) Date of Patent: Oct. 18, 2022

(54) ION EXCHANGE RESIN BAG AND ION EXCHANGE DEVICE

(71) Applicant: SUN MAINTENANCE KOKI CO., LTD., Nagoya Aichi (JP)

(72) Inventor: Hiroshi Fukai, Nagoya (JP)

(73) Assignee: SUN MAINTENANCE KOKI CO., LTD., Nagoya (JP)

( * ) Notice: Subject to any disclaimer, the term of this patent is extended or adjusted under 35 U.S.C. 154(b) by 0 days.

(21) Appl. No.: 16/625,739

(22) PCT Filed: Jun. 27, 2019

(86) PCT No.: PCT/JP2019/025664
§ 371 (c)(1),
(2) Date: Dec. 22, 2019

(87) PCT Pub. No.: WO2020/044766
PCT Pub. Date: Mar. 5, 2020

(65) Prior Publication Data
US 2020/0338472 A1      Oct. 29, 2020

(30) Foreign Application Priority Data
Aug. 30, 2018      (JP) .............................. JP2018-162149

(51) Int. Cl.
*B01D 15/22*      (2006.01)
*B01D 15/36*      (2006.01)
(Continued)

(52) U.S. Cl.
CPC ......... *B01D 15/22* (2013.01); *B01D 15/1871* (2013.01); *B01D 15/361* (2013.01);
(Continued)

(58) Field of Classification Search
None
See application file for complete search history.

(56) References Cited

U.S. PATENT DOCUMENTS 2,278,488 A    4/1942   Ralston
6,132,612 A    10/2000  Bourgeois
(Continued)

FOREIGN PATENT DOCUMENTS

CN    206827225 U    1/2018
JP    S49-095745 U   8/1974
(Continued)

OTHER PUBLICATIONS

Machine translation of JP 2002327417 (Year: 2002).*
(Continued)

*Primary Examiner* — Kara M Peo
(74) *Attorney, Agent, or Firm* — Muncy, Geissler, Olds & Lowe, P.C.

(57) ABSTRACT

An ion exchange resin bag 5 includes a bag body 51 and a reinforcing body 52. The bag body 51 has a bottom surface portion 511 that is provided at an end portion opposite to an end portion where an opening is provided and forms a bottom surface of the bag body, and a side surface portion 512 that is connected to the bottom surface portion 511 and forms a side surface of the bag body 51. The reinforcing body 52 has a first reinforcing portion 521 that is fixed to a boundary portion of the bottom surface portion 511 and the side surface portion 512, and a second reinforcing portion 522 that is connected to the first reinforcing portion 521 and fixed to at least a part of the side surface portion 512 and extends from the first reinforcing portion 521 toward the opening.

10 Claims, 8 Drawing Sheets

(51) Int. Cl.
    *B01D 15/18*     (2006.01)
    *B01J 47/024*     (2017.01)
    *B23H 1/10*     (2006.01)
    *C02F 1/42*     (2006.01)
    *C02F 103/34*     (2006.01)

(52) U.S. Cl.
    CPC .............. *B01J 47/024* (2013.01); *B23H 1/10* (2013.01); *C02F 1/42* (2013.01); *C02F 2103/34* (2013.01)

(56) References Cited

U.S. PATENT DOCUMENTS

| | | | | |
|---|---|---|---|---|
| 2016/0097073 A1* | 4/2016 | Niazi | .................. | C12M 47/02 435/69.1 |
| 2017/0173231 A1* | 6/2017 | Kiriyama | ................ | A61M 1/38 |

FOREIGN PATENT DOCUMENTS

| | | |
|---|---|---|
| JP | 50-009992 Y1 | 3/1975 |
| JP | S51-097543 U | 8/1976 |
| JP | S58-161893 U | 10/1983 |
| JP | H07-037388 U | 7/1995 |
| JP | H08-57471 A | 3/1996 |
| JP | H08-309621 A | 11/1996 |
| JP | 2002-327417 A | 11/2002 |
| JP | 3094487 U | 6/2003 |
| JP | 2014-159305 A | 9/2014 |

OTHER PUBLICATIONS

Written opinion of PCT/JP2019/025664 dated Aug. 13, 2019.
International Search Report of PCT/JP2019/025664 dated Aug. 13, 2019.
The extended European search report of the corresponding EP application No. 19817937.6 dated Apr. 25, 2022.

\* cited by examiner

ION EXCHANGE RESIN BAG AND ION EXCHANGE DEVICE

TECHNICAL FIELD

The present invention relates to an ion exchange resin bag accommodating an ion exchange resin, and to an ion exchange device that performs ion exchange of an ion exchange target liquid.

BACKGROUND ART

Generally, there are containers in which an ion exchange resin that performs ion exchange of an ion exchange target liquid is accommodated. Ion exchange of the ion exchange target liquid is performed by allowing the ion exchange target liquid to pass through the ion exchange resin accommodated in the container. Ion exchange resins have a life. That is, the ion exchange resin accommodated in the container is replaced with a new ion exchange resin when a predetermined amount of ions is exchanged. At this time, the ion exchange resin accommodated in the container is taken out of the container. However, there is a problem that it is troublesome for an operator such as a maintenance worker or the like to take out the ion exchange resin accommodated in the container and place a new ion exchange resin in the container.

To resolve this problem, PTL 1 discloses an ion exchange resin bag to be put in a resin tubular main body of an ion exchange resin device for an electric discharge machine. The operator can replace the ion exchange resin by taking out the ion exchange resin bag accommodating the ion exchange resin and put in the resin tubular main body from the resin tubular main body, and putting an ion exchange resin bag accommodating a new ion exchange resin in the resin tubular main body. A net bag of chemical fibers (for example, nylon or polyester fibers) is taken as a bag material of the ion exchange resin bag disclosed in PTL 1 in order to enable smooth insertion and removal of the bag.

However, PTL 1 does not disclose the specific shape of the ion exchange resin bag. Therefore, where the ion exchange resin bag is inserted into the resin tubular main body in a state of accommodating the ion exchange resin, the bag shape may not be maintained. Thus, where the ion exchange resin bag is inserted into the resin tubular main body in a state of accommodating the ion exchange resin, the ion exchange resin bag may be wrinkled or the ion exchange resin bag may deform. For this reason, even when the material of the ion exchange resin bag is chemical fibers, it may be difficult to put the ion exchange resin bag in the resin tubular main body or take the bag out of the resin tubular main body. The resulting problem is that it is difficult to replace the ion exchange resin.

Further, where the ion exchange resin bag wrinkles or the ion exchange resin bag deforms when the ion exchange resin bag is inserted into the resin tubular main body, the machining fluid of a discharge machining device may not flow uniformly inside the resin tubular main body and may pass through a part of the ion exchange resin. As a result, the degradation of the ion exchange resin in the region through which the machining liquid has passed advances faster than the deterioration of the ion exchange resin in other region through which the machining liquid does not pass. For this reason, it is necessary to take out the ion exchange resin bag and replace the entire ion exchange resin even when the ion exchange resin that still does not require the replacement is included. The resulting problem is that the life of the ion exchange resin is difficult to improve.

CITATION LIST

Patent Literature

[PTL 1] Japanese Utility Model Registration No. 3094487

SUMMARY OF INVENTION

Technical Problem

The present invention has been accomplished to solve the above-described problems, and it is an object thereof to provide an ion exchange resin bag and an ion exchange device that make it possible to replace the ion exchange resin easily or to improve the life of the ion exchange resin.

Solution to Problem

According to the present invention, the aforementioned problem is resolved with an ion exchange resin bag accommodating an ion exchange resin to be used in an ion exchange device, the ion exchange resin bag comprising: a bag body that is formed of a resin mesh, has a bag shape and accommodates the ion exchange resin; and a reinforcing body provided in the bag body and reinforcing the bag body, wherein the bag body has a bottom surface portion that is provided at an end portion opposite to an end portion where an opening is provided and forms a bottom surface of the bag body, and a side surface portion that is connected to the bottom surface portion and forms a side surface of the bag body; and the reinforcing body has a first reinforcing portion that is fixed to a boundary portion of the bottom surface portion and the side surface portion, and a second reinforcing portion that is connected to the first reinforcing portion and fixed to at least a part of the side surface portion and extends from the first reinforcing portion toward the opening.

With the aforementioned configuration, the ion exchange resin bag includes the bag body and the reinforcing body. The bag body is formed of a resin mesh and accommodates the ion exchange resin. Further, the bag body has the bottom surface portion and the side surface portion. The bottom surface portion is provided at the end portion opposite to the end portion where the opening is provided and forms the bottom surface of the bag body. The side surface portion is connected to the bottom surface portion and forms the side surface of the bag body. The reinforcing body is provided in the bag body and reinforces the bag body. Further, the reinforcing body has the first reinforcing portion and the second reinforcing portion. The first reinforcing portion is fixed to the boundary portion of the bottom surface portion of the bag body and the side surface portion of the bag body. The second reinforcing portion is connected to the first reinforcing portion and fixed to at least a part of the side surface portion of the bag body and extends from the first reinforcing portion to the opening of the bag body.

Since the bag body is formed of a resin mesh, the ion exchange resin bag of the present invention can be inserted into an ion exchange device main body (tubular body) more smoothly than an ion exchange resin bag formed of a nonwoven fabric or the like. Further, since the bag body is reinforced by the reinforcing body having the first reinforcing portion and the second reinforcing portion, the ion exchange resin bag can maintain the shape before and after being inserted into the ion exchange device main body (tubular body). In other words, in the ion exchange resin bag of the present invention, wrinkling and deformation can be suppressed after insertion into the ion exchange device main body. Therefore, the operator can easily insert the ion exchange resin bag into the ion exchange device main body and can easily take the ion exchange resin bag out of the ion exchange device main body. As a result, the operator can easily perform the operation of replacing the ion exchange resin.

Further, in the ion exchange resin bag of the present invention, wrinkling and deformation can be suppressed after insertion into the ion exchange device main body. Therefore, the occurrence of a gap between the ion exchange resin bag and the ion exchange device main body can be prevented. In order words, the ion exchange resin bag can be brought into close contact with the inner wall of the ion exchange device main body while maintaining the shape before and after insertion into the ion exchange device main body. Therefore, the ion exchange target liquid flows substantially uniformly inside the ion exchange device main body. For this reason, the deterioration of the ion exchange resin accommodated in the ion exchange resin bag proceeds to the same degree throughout the resin. As a result, unevenness in the deterioration rate of the ion exchange resin observed in transition to the inner region of the ion exchange resin bag can be suppressed, and the life of the ion exchange resin can be improved.

In addition, in a state where the ion exchange resin is accommodated in the ion exchange resin bag, it is possible to prevent, for example, different types of ion exchange resins (for example, anion exchange resins and cation exchange resins) from being stacked in a state of mutual separation. As a result, the life of the ion exchange resin can be improved. The life of the ion exchange resin can be also improved by manually kneading the ion exchange resin accommodated in the ion exchange resin bag.

In the ion exchange resin bag according to the present invention, preferably, the second reinforcing portion is connected at one end portion to a first connection portion of the first reinforcing portion and is connected at the other end portion on the side opposite to the one end portion to a second connection portion of the first reinforcing portion at a position different from the position of the first connection portion, and an intermediate portion between the one end portion and the other end portion serves as a grip portion that can be gripped.

With the aforementioned configuration, the second reinforcing portion is connected at both end portions to mutually different positions of the first reinforcing portion. Further, the intermediate portion of the second reinforcing portion serves as a grip portion that can be gripped. Therefore, the operator can grip the second reinforcing portion (grip portion) to insert the ion exchange resin bag into the ion exchange device main body, or to take the ion exchange resin bag out from the ion exchange device main body. As a result, the operator can easily perform the operation of replacing the ion exchange resin.

In the ion exchange resin bag according to the present invention, preferably, the resin is a resin including a polyester.

With the aforementioned configuration, friction occurring between the bag body and the ion exchange device main body can be further suppressed. As a result, the operator can easily insert the ion exchange resin bag into the ion exchange device main body and easily take the ion exchange resin bag out of the ion exchange device main body.

In the ion exchange resin bag according to the present invention, preferably, the mesh opening of the mesh is 28 µm or more and 195 µm or less, and the mesh number of the mesh is 86 mesh or more and 460 mesh or less.

With the aforementioned configuration, the occurrence of mesh clogging can be suppressed, and the ion exchange target liquid cam smoothly and substantially uniformly pass through the ion exchange resin and the bag body. That is, water permeability (drainage or drainage performance) with respect to the ion exchange resin and the bag body can be improved. As a result, unevenness in the deterioration rate of the ion exchange resin observed in transition to the inner region of the ion exchange resin bag can be suppressed, and the life of the ion exchange resin can be improved. Further, since the amount of water contained in the ion exchange resin and the bag body can be suppressed, the operator can easily take out the ion exchange resin bag from the ion exchange device main body.

The ion exchange resin bag according to the present invention, preferably, further includes blocking means that is provided in the opening of the bag body and closes the opening.

With the aforementioned configuration, the operator can easily refill the ion exchange resin through the opening of the bag body and can prevent the ion exchange resin from leaking from the bag body by closing the opening with the blocking means after the ion exchange resin has been refilled.

In the ion exchange resin bag according to the present invention, preferably, at least either one of the bag body and the reinforcing body has identification means for discriminating between a certain ion exchange resin bag and another ion exchange resin bag.

With the aforementioned configuration, where a plurality of ion exchange resin bags is inserted into an ion exchange device main body, the operator can discriminate between the plurality of ion exchange resin bags by looking at the identification means. For example, the operator can determine the mixing ratio of the ion exchange resins (for example, an anion exchange resin and a cation exchange resin) accommodated in the ion exchange resin bag.

According to the present invention, the aforementioned problem is resolved with an ion exchange device that performs ion exchange of an ion exchange target liquid, the ion exchange device comprising: an ion exchange device main body into which the ion exchange target liquid flows from one side and from which the ion exchange target liquid flows from the other side; and an ion exchange resin bag that is detachably provided inside the ion exchange device main body, has a resin mesh and accommodates an ion exchange resin, wherein the plurality of ion exchange resin bags are stacked inside the ion exchange device main body along the flow direction of the ion exchange target liquid inside the ion exchange device main body.

With the aforementioned configuration, the ion exchange device has an ion exchange device main body and a plurality of ion exchange resin bags. In the ion exchange device main body, the ion exchange target liquid flows in from one side and flow out from the other side. The ion exchange resin bag is detachably provided inside the ion exchange device main body, has a resin mesh, and accommodates the ion exchange resin. Further, the plurality of ion exchange resin bags are stacked inside the ion exchange device main body along the flow direction of the ion exchange target liquid inside the ion exchange device main body.

Since the ion exchange resin bag has a resin mesh, the bag can be inserted into the ion exchange device main body more smoothly than the ion exchange resin bag formed of non-woven fabric or the like. Further, since the ion exchange resin is accommodated in the plurality of ion exchange resin bags, the size of each ion exchange resin bag can be reduced. Therefore, the contact area between the ion exchange resin bag and the ion exchange device main body can be suppressed, and friction generated between the ion exchange resin bag and the ion exchange device main body can be suppressed. As a result, the operator can easily insert the ion exchange resin bag into the ion exchange device main body or take the ion exchange resin bag out of the ion exchange device main body. As a consequence, the operator can easily perform the operation of replacing the ion exchange resin.

In addition, since the size of each ion exchange resin bag can be reduced, it is possible to prevent the ion exchange resin bag from being wrinkled or the shape of the ion exchange resin bag from collapsing after the ion exchange resin bag has been inserted into the ion exchange device main body. Therefore, it is possible to suppress the occurrence of a gap between the ion exchange resin bag and the ion exchange device main body. That is, the ion exchange resin bag can be in close contact with the inner wall of the ion exchange device main body. Further, the plurality of ion exchange resin bags are stacked inside the ion exchange device main body along the flow direction of the ion exchange target liquid inside the ion exchange device main body. For this reason, the ion exchange target liquid flows substantially uniformly inside the ion exchange device main body and substantially uniformly inside the ion exchange resin bag. Therefore, the deterioration of the ion exchange resin accommodated in the ion exchange resin bag proceeds to the same degree throughout the resin. As a result, unevenness in the deterioration rate of the ion exchange resin observed with the transition to the inner region of the ion exchange resin bag can be suppressed, and the life of the ion exchange resin can be improved. In addition, the life of the ion exchange resin can be further improved by changing the mutual arrangement of the plurality of ion exchange resin bags along the flow direction of the ion exchange target liquid inside the ion exchange device main body.

In the ion exchange device according to the present invention, preferably, the ion exchange resin bag is any one of the abovementioned ion exchange resin bags.

With the aforementioned configuration the operator can easily insert the ion exchange resin bag into the ion exchange device main body and easily take the ion exchange resin bag out of the ion exchange device main body. Further, the occurrence of mesh clogging can be suppressed, and the ion exchange target liquid can smoothly and substantially uniformly pass through the ion exchange resin and the bag body. That is, water permeability (drainage or drainage performance) with respect to the ion exchange resin and the bag body can be improved. As a result, unevenness in the deterioration rate of the ion exchange resin observed in transition to the inner region of the ion exchange resin bag can be suppressed, and the life of the ion exchange resin can be improved. Further, since the amount of water contained in the ion exchange resin and the bag body can be suppressed, the operator can easily take out the ion exchange resin bag from the ion exchange device main body. In addition, the operator can easily refill the ion exchange resin through the opening of the bag body and can prevent the ion exchange resin from leaking from the bag body by closing the opening with the blocking means after the ion exchange resin has been refilled.

Advantageous Effects of Invention

According to the present invention, it is possible to provide an ion exchange resin bag and an ion exchange device that make it possible to replace the ion exchange resin easily or to improve the life of the ion exchange resin.

DESCRIPTION OF EMBODIMENTS

Figure 1:
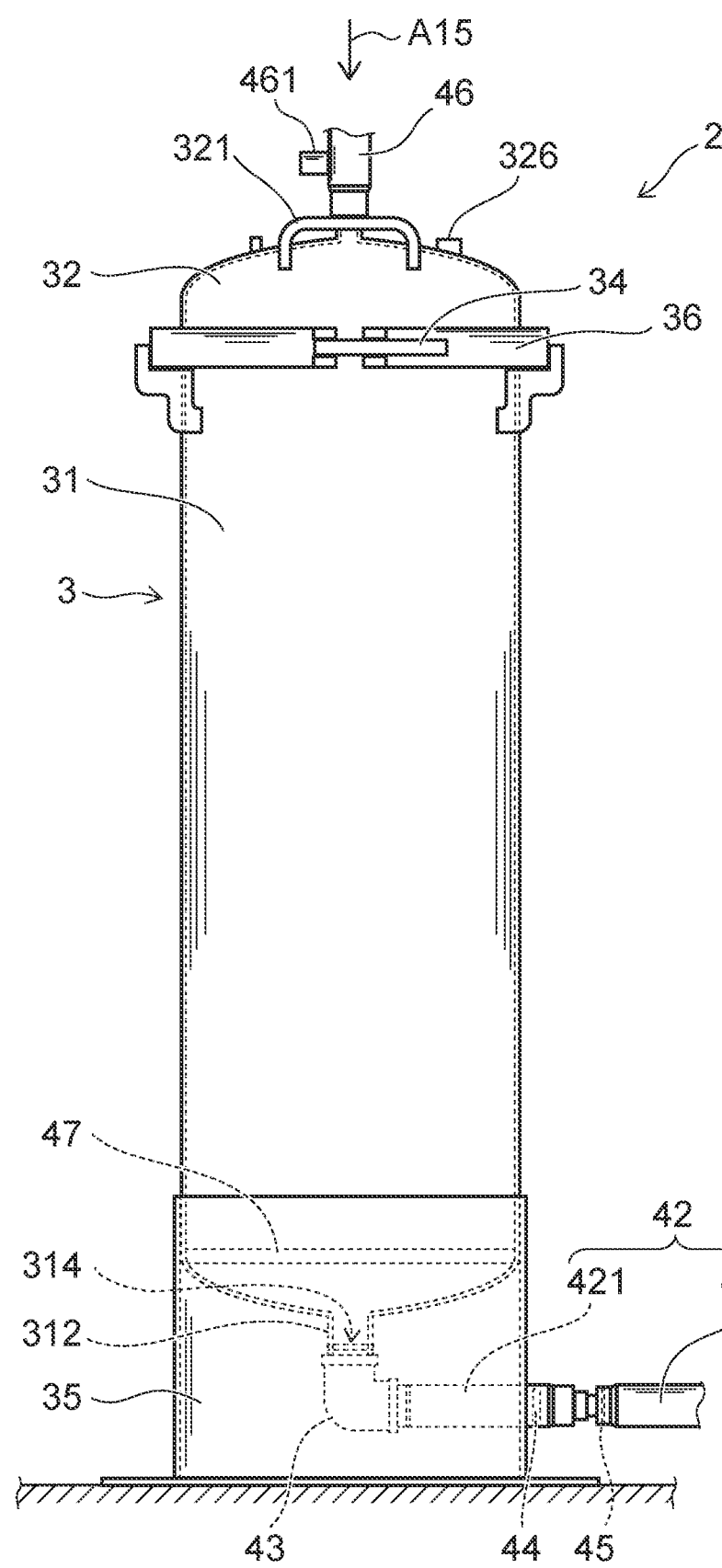
FIG. 1 is a plan view showing an ion exchange device according to an embodiment of the present invention.

Hereinafter, preferred embodiments of the present invention will be described in detail with reference to the drawings.

The embodiments described below are preferable specific examples of the present invention, and thus various technically preferable limitations are imposed. However, the scope of the present invention is not limited to these embodiments unless it is specifically indicated that the present invention is particularly limited to the following description. Moreover, in the drawings, the same symbol is attached to the same component and detailed description is omitted as appropriate.

Figure 2:
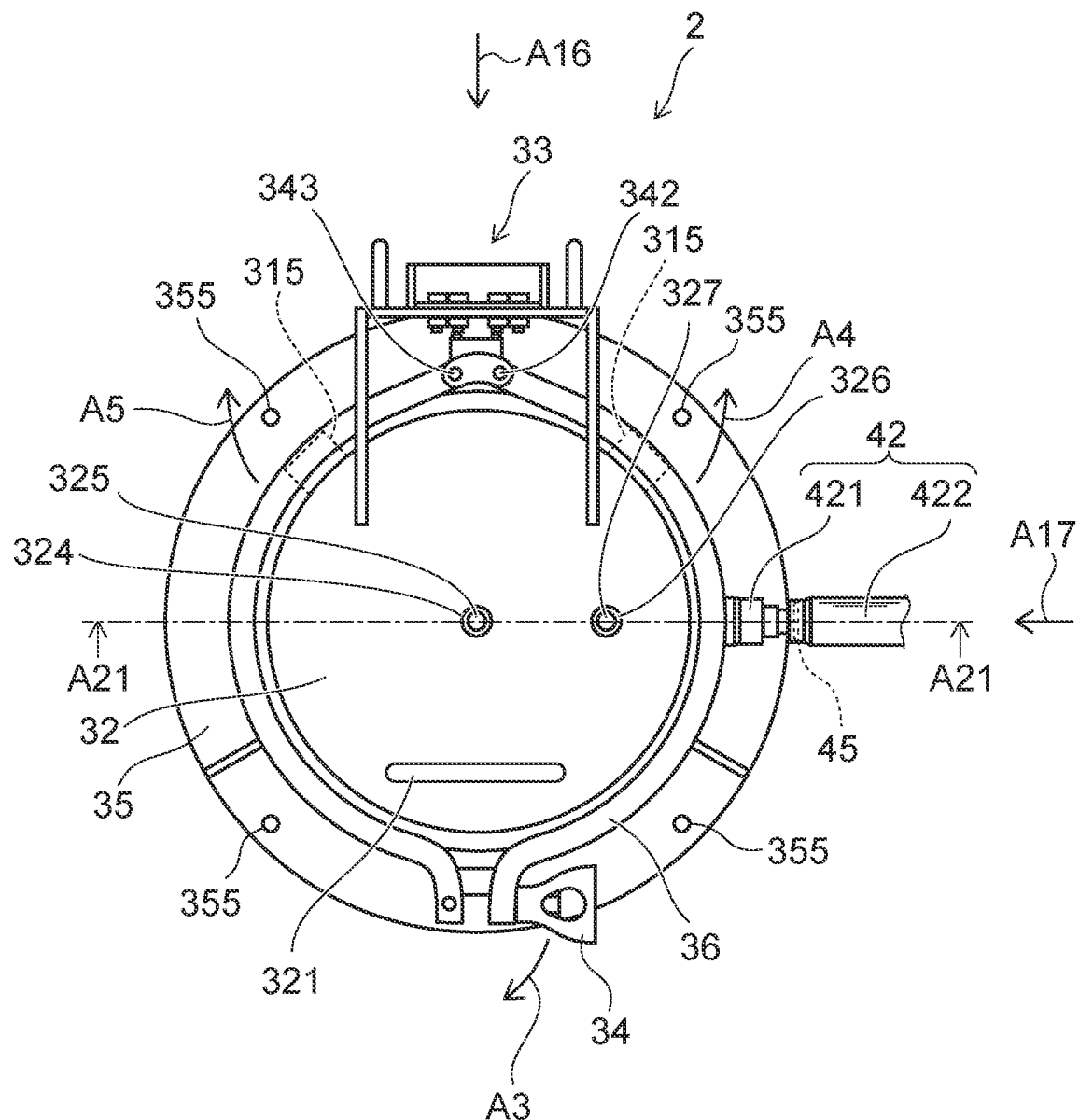
FIG. 2 is a top view showing the ion exchange device of the present embodiment.
Figure 3:
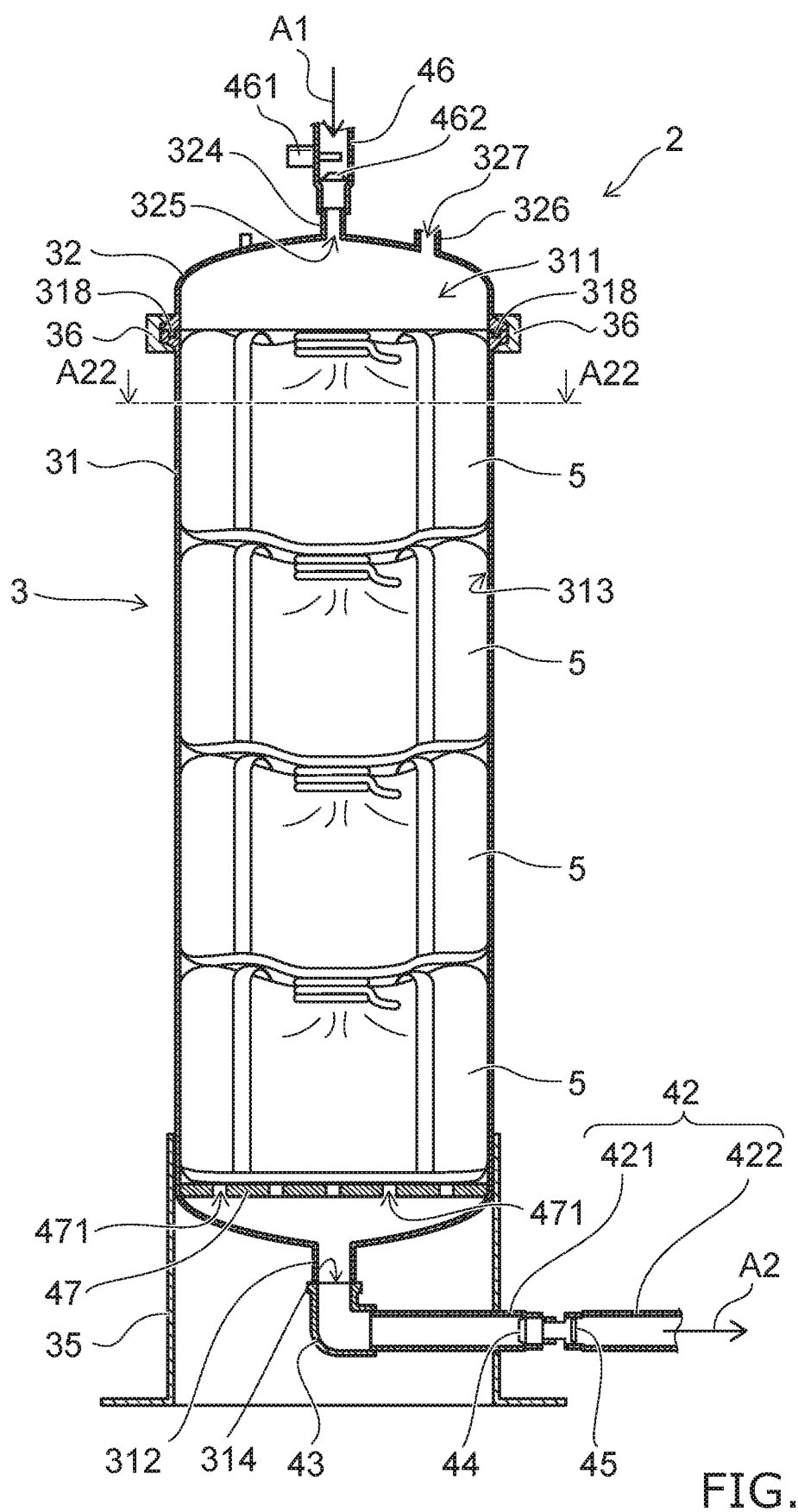
FIG. 3 is a cross-sectional view taken along a cutting plane A21-A21 shown in FIG. 2.
Figure 4:
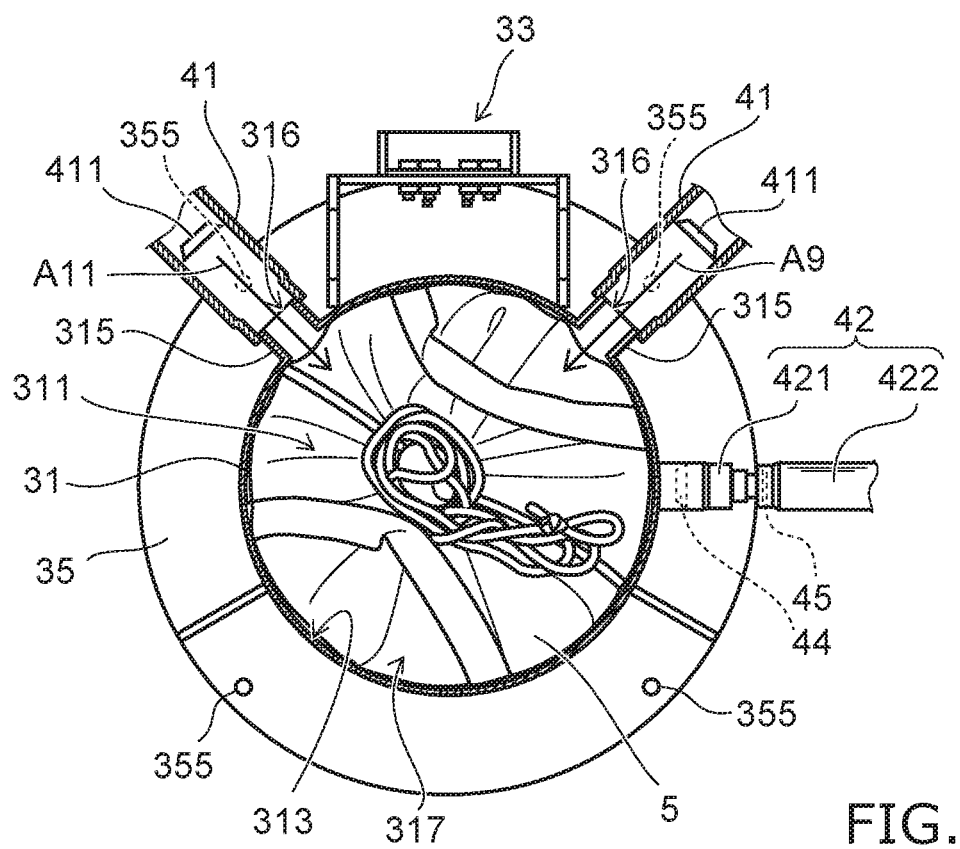
FIG. 4 is a cross-sectional view taken along a cutting plane A22-A22 shown in FIG. 3.

FIG. 1 is a plan view showing an ion exchange device according to an embodiment of the present invention.
FIG. 2 is a top view showing the ion exchange device of the present embodiment.
FIG. 3 is a cross-sectional view taken along a cutting plane A21-A21 shown in FIG. 2.
FIG. 4 is a cross-sectional view taken along a cutting plane A22-A22 shown in FIG. 3.
FIG. 2 corresponds to a plan view of the ion exchange device 2 as viewed from the direction of the arrow A15 shown in FIG. 1. For convenience of explanation, the ion exchange resin bag 5 shown in FIGS. 3 and 4 is displayed as a plan view. For convenience of explanation, a liquid introduction pipe 41 is omitted in FIG. 2.

The ion exchange device 2 according to the present embodiment performs ion exchange of a liquid (ion exchange target liquid or liquid to be ion exchanged) that is the target of ion exchange by an ion exchange resin. For example, the ion exchange device 2 is an ion exchange device of an electric discharge machine that performs wire electric discharge machining or the like. That is, when water (pure water) is used as the machining liquid of the electric discharge machine, the ion exchange device 2 performs ion exchange of the machining liquid (ion exchange target liquid) that has passed through the filter in order to keep the electrical conductivity of the machining liquid at an appropriate value. Alternatively, for example, in the process of producing pure water, the ion exchange device 2 performs ion exchange of raw water in order to remove calcium ions (Ca2+), sodium ions (Na+), silicate ions (SiO44+), and the like contained in the water. Thus, the ion exchange device 2 according to the present embodiment can be used in an electric discharge machining or pure water production process, and can be applied to an ion exchange device that performs ion exchange with an ion exchange resin. Here, in the present specification, the "ion exchange resin" is inclusive of a resin that exhibits a chelating action. In the following description, the case where the ion exchange device 2 is an ion exchange device of an electric discharge machine is taken as an example.

As shown in FIGS. 1 and 3, the ion exchange device 2 according to the present embodiment includes an ion exchange device main body (hereinafter referred to as "main body" for convenience of explanation) 3 and ion exchange resin bags 5. The main body 3 of the present embodiment corresponds to the "ion exchange device main body" of the present invention. The main body 3 includes a tubular body 31, a lid 32, a lead-out pipe 42, and a check valve 44. The ion exchange resin bag 5 accommodates an ion exchange resin.

The tubular body 31 has an internal space 311 and has a tubular shape. One end portion (upper end portion in FIG. 2) of the tubular body 31 is open as an opening 317. Meanwhile, a liquid outlet 312 is provided at the other end portion (lower end portion in FIG. 2) of the tubular body 31. The liquid outlet 312 has a liquid outlet port 314 through which the ion exchange target liquid passes, and can discharge the ion exchange target liquid to the outside of the tubular body 31 through the liquid outlet port 314. As shown in FIGS. 1 and 3, the lower end portion of the tubular body 31 has a dome-like curved shape. The liquid outlet 312 is provided at the apex of the dome shape. As a result, the ion exchange target liquid that has been injected into the internal space 311 of the tubular body 31 and passed through the ion exchange resin accommodated in the ion exchange resin bag 5 is more reliably discharged to the outside of the tubular body 31 through the liquid outlet port 314 of the liquid outlet 312. The shape of the lower end portion of the tubular body 31 is not limited to a dome shape, and may have, for example, a flat shape.

As shown in FIGS. 2 and 4, the tubular body 31 has a liquid injection portion 315. The liquid injection portion 315 has a liquid injection port 316, and the ion exchange target liquid can be injected into the internal space 311 of the tubular body 31 through the liquid injection port 316, as shown by arrows A9 and A11 shown in FIG. 4. A liquid introduction pipe 41 is connected to the liquid injection portion 315. The liquid introduction pipe 41 has a check valve 411 that prevents the backflow of the ion exchange target liquid, and can guide the ion exchange target liquid to the internal space 311 of the tubular body 31 while suppressing the backflow of the ion exchange target liquid. The liquid injection portion 315 is not limited to being provided in the tubular body 31, and may be provided in the lid 32.

As shown in FIG. 3, a support plate 47 is provided at the lower end portion of the internal space 311 of the tubular body 31. As described above, the lower end portion of the tubular body 31 has a dome-like curved shape. Therefore, the support plate 47 is hooked and installed in a reduced-diameter portion at the lower end portion of the tubular body 31 in the internal space 311 of the tubular body 31. The support plate 47 is provided on the upstream side of the liquid outlet 312 and supports the ion exchange resin bag 5 accommodating the ion exchange resin. The support plate 47 has a liquid passage hole 471 through which the ion exchange target liquid passes. The ion exchange target liquid that has passed through the ion exchange resin accommodated in the ion exchange resin bag 5 passes through the liquid passage hole 471 of the support plate 47 and is discharged to the outside of the tubular body 31 through the liquid outlet port 314 of the liquid outlet 312.

As a result, when the ion exchange target liquid passes through the ion exchange resin and is discharged through the liquid outlet port 314 of the liquid outlet 312, the support plate 47 can prevent the ion exchange resin bag 5 from being sucked into the liquid outlet port 314 of the liquid outlet 312. As a consequence, the support plate 47 can prevent the ion exchange resin bag 5 from being torn and can prevent the ion exchange resin from coming out of the ion exchange resin bag 5. Note that the support plate 47 is not necessarily provided. For example, a mesh may be installed in a port at the upstream side of the liquid outlet 312. In this case, the mesh installed in the port at the upstream of the liquid outlet 312 can prevent the ion exchange resin bag 5 from being sucked into the liquid outlet port 314 of the liquid outlet 312.

The lid 32 is supported by a hinge 33 so as to be rotatable with respect to the tubular body 31. The lid 32 is rotatable with respect to the tubular body 31 around a shaft 333 (see FIG. 6) of the hinge 33, and can open and close the opening 317 of the tubular body 31. A soft closing unit (damper unit) that slowly closes the lid 32 with respect to the tubular body 31 may be provided at the portion of the shaft 333 of the hinge 33. The operator rotates the lid 32 using a handle 321 (see FIG. 1) provided on the lid 32 and opens the opening 317 of the tubular body 31, thereby making it possible to insert the ion exchange resin bag 5 into the internal space 311 of the tubular body 31 through the opening 317 of the tubular body 31, or to take the ion exchange resin bag 5 out of the internal space 311 of the tubular body 31.

Similar to the lower end portion of the tubular body 31, the lid 32 has a dome-like curved shape. As a result, the tolerance of the lid 32 with respect to the pressure of gas inject into the internal space 311 of the tubular body 31 is higher than when the lid is a flat plate. For this reason, it is possible to reduce the thickness of the lid 32 and to reduce the weight of the lid 32. Therefore, the operator can easily operate the lid 32. Note that the shape of the lid 32 is not limited to a dome shape, and may have, for example, a flat shape.

The lid 32 has a gas injection portion 324 and a gas outlet 326. The gas injection portion 324 has a gas injection port 325 through which a gas such as air passes, and makes it possible to inject the gas into the internal space 311 of the tubular body 31 through the gas injection port 325. A gas introduction pipe 46 is connected to the gas injection portion 324. As shown by an arrow A1 in FIG. 3, the gas introduction pipe 46 can guide a gas such as air to the internal space 311 of the tubular body 31 through the gas injection port 325 of the gas injection portion 324. The gas introduction pipe 46 is provided with an adjustment valve 461 and a check valve 462. The adjustment valve 461 can adjust the pressure of gas injected into the internal space 311 of the tubular body 31. The check valve 462 prevents the gas injected into the internal space 311 of the tubular body 31 from flowing backward to the outside of the tubular body 31.

For example, the operator can reduce the pressure of the gas injected into the internal space 311 of the tubular body 31 by the adjustment valve 461 and guide the gas to the internal space 311 of the tubular body 31 through the gas introduction pipe 46. As a result, the gas pressure in the internal space 311 of the tubular body 31 is prevented from becoming too high. Accordingly, the gas introduction pipe 46 can be connected to the gas injection portion 324 by using a detachable connector such as a coupler without using a fastening member such as a screw. As a result, the operator can improve the workability when the gas introduction pipe 46 is connected to the gas injection portion 324 and the gas is injected into the internal space 311 of the tubular body 31, and the connection structure of the gas injection portion 324 and the gas introduction pipe 46 can be reduced in size.

The gas outlet 326 has a gas outlet port 327 through which gas passes, and can discharge the gas to the outside of the tubular body 31 through the gas outlet port 327. For example, an opening/closing valve that can be manually opened and closed is provided in the gas outlet 326 or the gas discharge pipe connected to the gas outlet 326. For example, the operator can reduce the gas pressure in the internal space 311 of the tubular body 31 by opening the opening/closing valve and discharging the gas injected into the internal space 311 of the tubular body 31 to the outside of the tubular body 31 through the gas outlet port 327 of the gas outlet 326. In other words, the gas outlet port 327 of the gas outlet 326 is a hole for removing the gas present in the internal space 311 of the tubular body 31 and reducing the gas pressure in the internal space 311 of the tubular body 31.

The main body 3 (the tubular body 31 and the lid 32) is formed of a metal including, for example, iron or aluminum. However, the material of the main body 3 is not limited to a metal.

A clamp 36 and a lock portion 34 are provided at a boundary portion between the tubular body 31 and the lid 32. The clamp 36 is provided over substantially the entire circumference of the boundary portion between the tubular body 31 and the lid 32, and can sandwich the tubular body 31 and the lid 32. The lock portion 34 is, for example, a fastening member such as a screw or a bolt, and is provided at one end of the clamp 36 and can clamp the clamp 36 in the circumferential direction. Further, as shown in FIG. 3, an O-ring 318 is provided at a portion where the tubular body 31 and the lid 32 are in contact with each other. The O-ring 318 is fixed to at least one of the tubular body 31 and the lid 32, and is formed, for example, of an elastic material such as ethylene propylene rubber. The material of the O-ring 318 is not particularly limited. The operator can tighten the clamp 36 in the circumferential direction, tighten the tubular body 31 and the lid 32, and bring the tubular body 31 and the lid 32 into close contact with each other by fastening the lock portion 34. Meanwhile, the operator can unlock the lock portion 34, rotate the lock portion 34 in the direction of an arrow A3 shown in FIG. 2, rotate the clamp 36 in the direction of an arrow A4 shown in FIG. 2 around the shaft 342 (see FIG. 2), and rotate the clamp 36 in the direction of an arrow A5 shown in FIG. 2 about the shaft 343 (see FIG. 2), thereby releasing the fastening of the tubular body 31 and the lid 32. The fastening structure of the tubular body 31 and the lid 32 is not limited to that having the clamp 36 and the lock portion 34. That is, as long as the tubular body 31 and the lid 32 can be tightened together and the tubular body 31 and the lid 32 can be brought into close contact with each other, the fastening structure of the tubular body 31 and the lid 32 is not particularly limited. For example, the fastening structure of the tubular body 31 and the lid 32 may have a one-touch type locking mechanism.

The lead-out pipe 42 is connected to the liquid outlet 312. Specifically, the lead-out pipe 42 is connected to the liquid outlet 312 through an elbow 43. As indicated by an arrow A2 shown in FIG. 3, the lead-out pipe 42 guides the ion exchange target liquid that has passed through the ion exchange resin to the outside of the tubular body 31. The lead-out pipe 42 includes a first lead-out pipe body 421 and a second lead-out pipe body 422. One end portion of the first lead-out pipe body 421 is connected to the liquid outlet 312 through the elbow 43. The other end portion of the first lead-out pipe body 421 is connected to one end portion of the second lead-out pipe body 422. The second lead-out pipe body 422 is detachably connected to the first lead-out pipe body 421 on the downstream side of the first lead-out pipe body 421. For example, a lock mechanism for fixing the connection between the first lead-out pipe body 421 and the second lead-out pipe body 422 is provided between the first lead-out pipe body 421 and the second lead-out pipe body 422. The operator can remove the second lead-out pipe body 422 from the first lead-out pipe body 421 by releasing the lock of the locking mechanism.

A check valve 44 is provided in the first lead-out pipe body 421. The check valve 44 prevents the ion exchange target liquid from flowing backward from the outside of the tubular body 31 to the internal space 311 of the tubular body 31.

The second lead-out pipe body 422 is provided with a mesh 45. That is, the mesh 45 is provided on the downstream side of the check valve 44 in the lead-out pipe 42. The mesh 45 prevents the ion exchange resin from flowing out of the lead-out pipe 42. For example, the mesh 45 is made of a metal and has a coarser mesh structure than the mesh structure of the ion exchange resin bag 5. Details of the mesh structure of the ion exchange resin bag 5 will be described hereinbelow.

A pedestal 35 is provided at the other end (lower end in FIG. 2) of the tubular body 31. The pedestal 35 is fixed to the tubular body 31 and supports the tubular body 31. For example, the pedestal 35 is fixed to the lower end of the tubular body 31 by welding. As shown in FIG. 2 and FIG. 4, the pedestal 35 has holes 355 arranged circumferentially. For example, the operator can fasten the pedestal 35 and an installation surface and fix the ion exchange device 2 to the installation surface by tightening fastening members such as bolts to the installation surface through the holes 355 of the pedestal 35.

Next, the ion exchange device main body according to the present embodiment will be further described with reference to the drawings.

Figure 5:
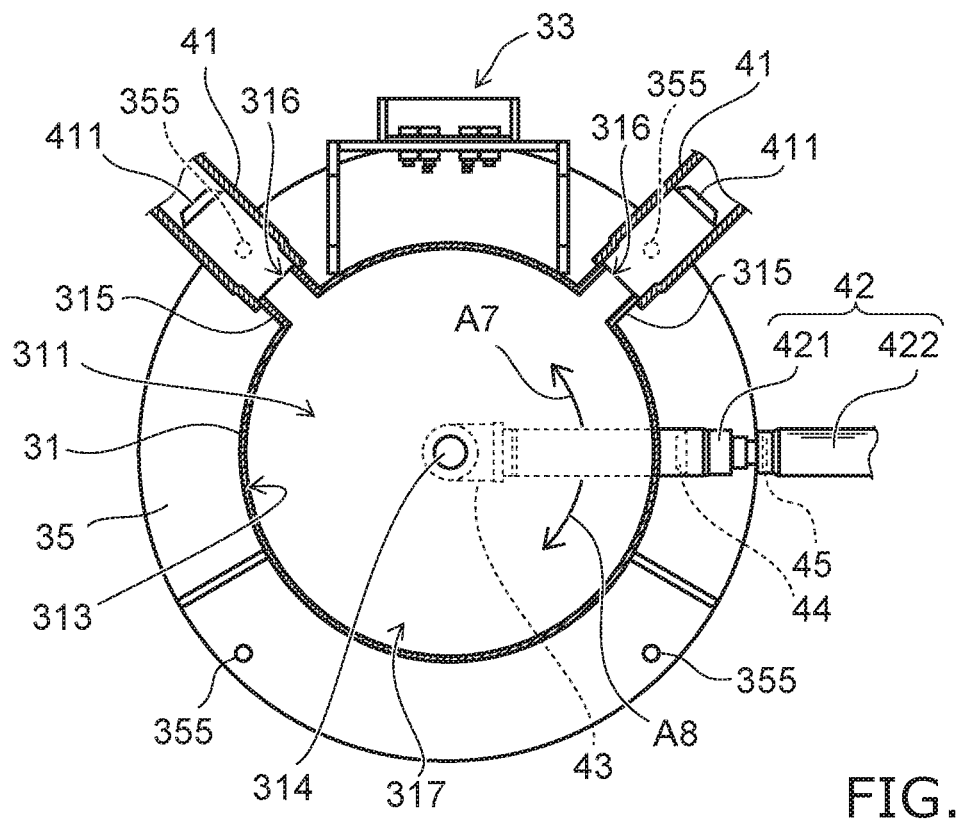
FIG. 5 is a cross-sectional view taken along a cutting plane A22-A22 shown in FIG. 3.

FIG. 5 is a cross-sectional view taken along a cutting plane A22-A22 shown in FIG. 3.

Figure 6:
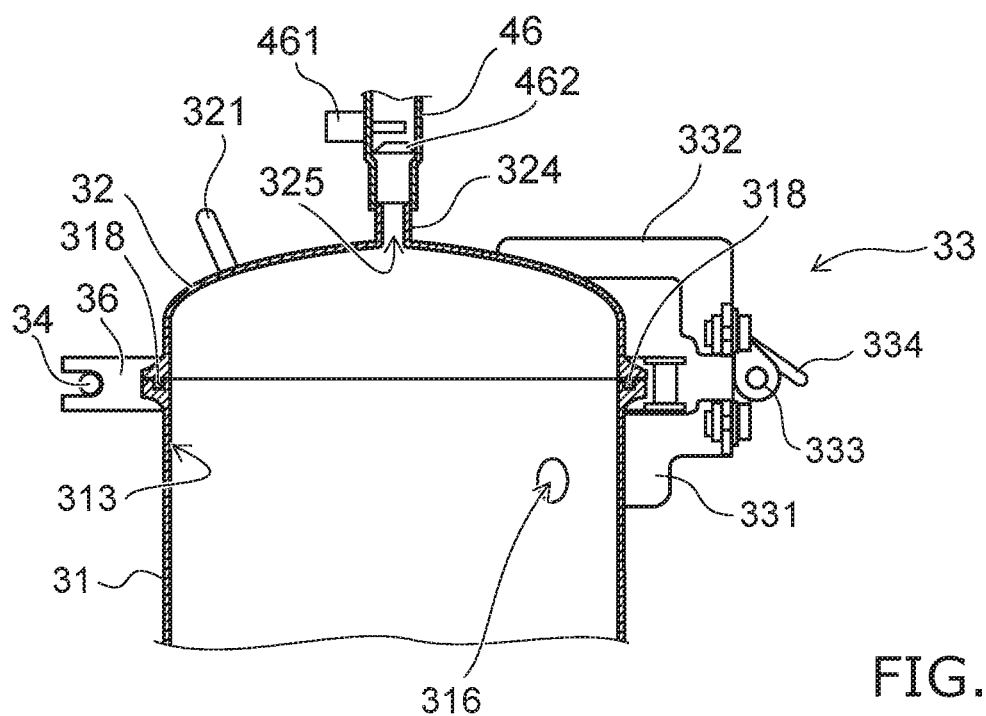
FIG. 6 is a cross-sectional view taken along a cutting plane A21-A21 shown in FIG. 2.
Figure 7:
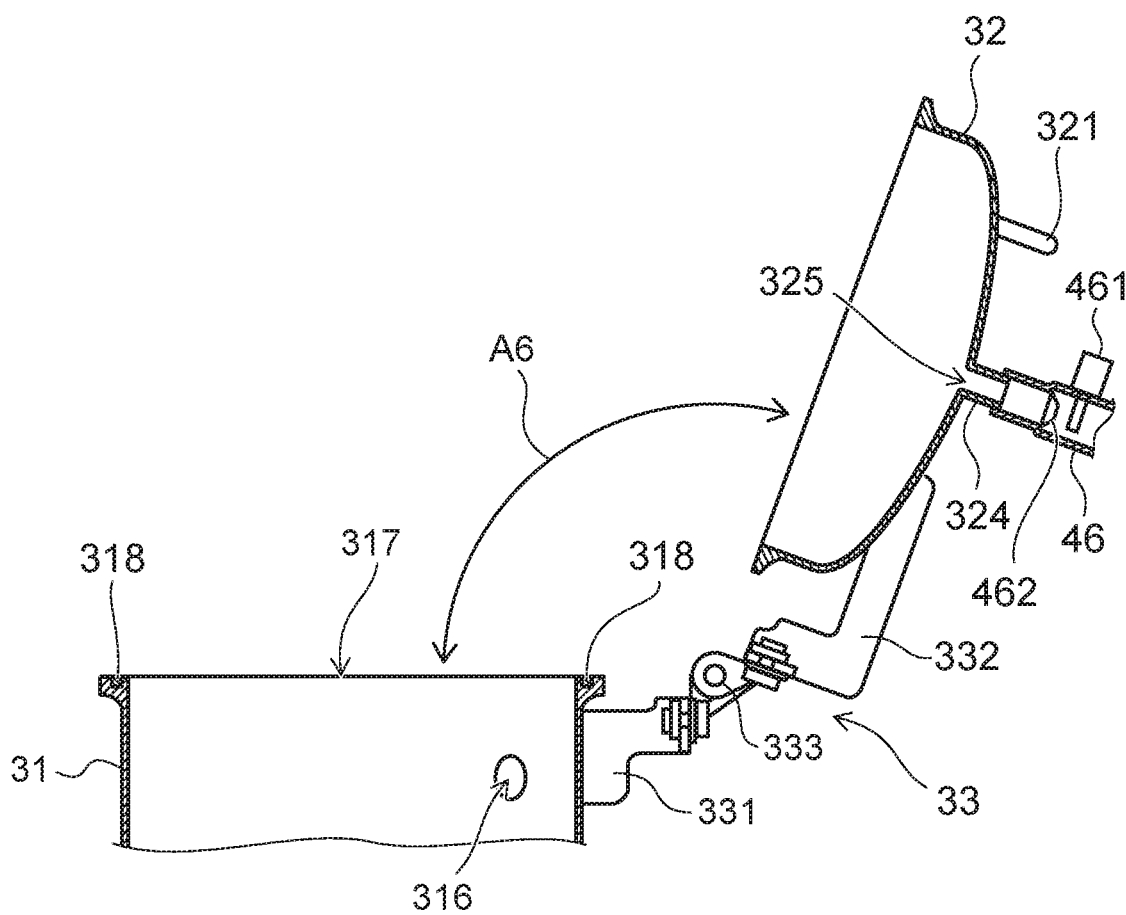
FIG. 7 is a cross-sectional view taken along a cutting plane A21-A21 shown in FIG. 2.

FIGS. 6 and 7 are cross-sectional views taken along a cutting plane A21-A21 shown in FIG. 2.

Figure 8:
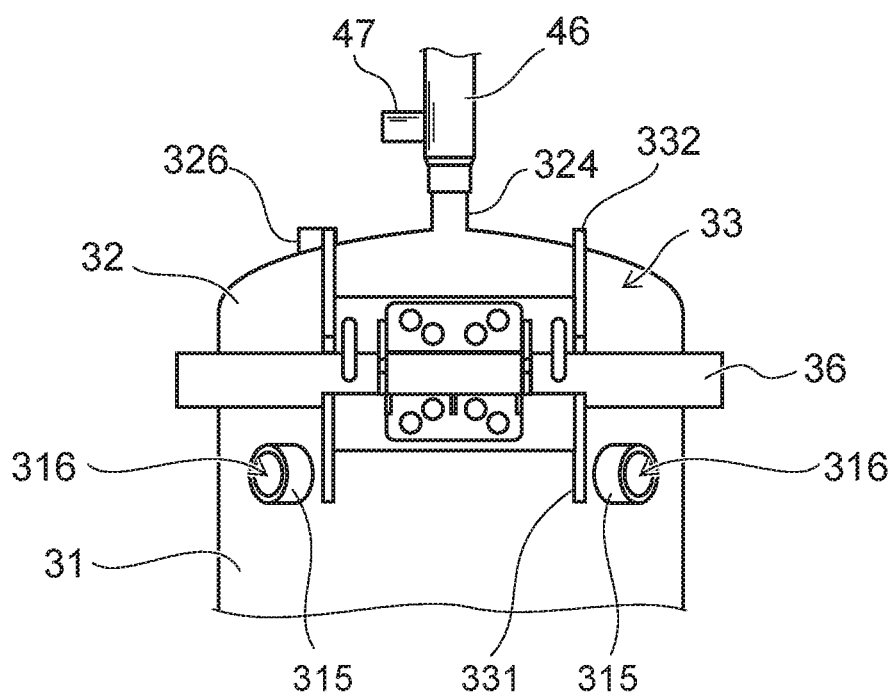
FIG. 8 is a rear view showing the ion exchange device main body according to the present embodiment.

FIG. 8 is a rear view showing the ion exchange device main body according to the present embodiment.

Figure 9:
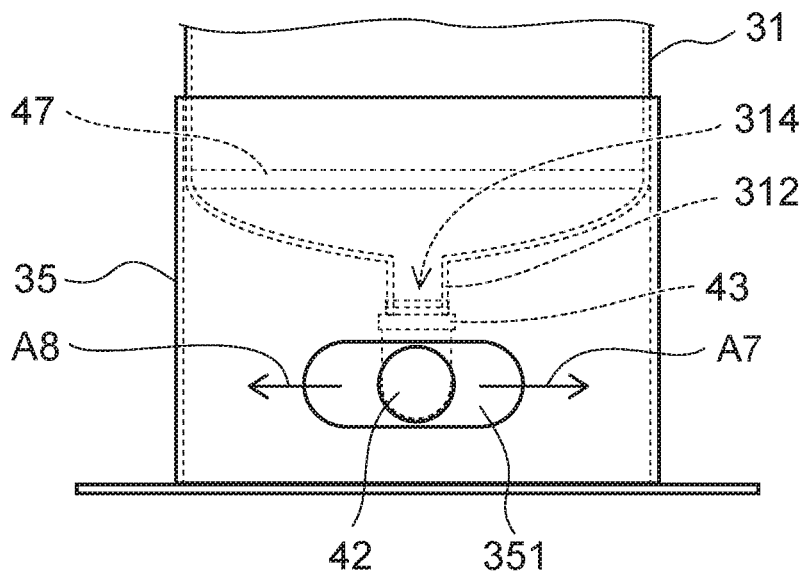
FIG. 9 is a side view showing an ion exchange device main body according to the present embodiment.

FIG. 9 is a side view showing the ion exchange device main body according to the present embodiment.

FIGS. 5 to 9 are diagrams for explaining the ion exchange device main body according to the present embodiment, and the ion exchange resin bag 5 is therein omitted. FIG. 6 shows a state in which the lid 32 closes the opening 317 of the tubular body 31. FIG. 7 shows a state in which the lid 32 opens the opening 317 of the tubular body 31. FIG. 8 corresponds to a plan view when the main body 3 is viewed from the direction of an arrow A16 shown in FIG. 2. FIG. 9 corresponds to a plan view when the main body 3 is viewed from the direction of an arrow A17 shown in FIG. 2. For convenience of explanation, the liquid introduction pipe 41 is omitted in FIG. 8.

As shown in FIGS. 6 to 8, the hinge 33 that rotatably supports the lid 32 with respect to the tubular body 31 includes a first hinge body 331 fixed to the tubular body 31, a second hinge body 332 fixed to the lid 32, and a stopper 334. The second hinge body 332 is supported so as to be rotatable with respect to the first hinge body 331 about the shaft 333. Accordingly, as indicated by an arrow A6 shown in FIG. 7, the lid 32 is rotatable with respect to the tubular body 31 about the shaft 333 of the hinge 33. The stopper 334 limits the rotation range of the lid 32 with respect to the tubular body 31 and prevents the lid 32 from opening excessively with respect to the tubular body 31.

As indicated by arrows A7 and A8 shown in FIGS. 5 and 9, the lead-out pipe 42 is rotatably connected to the liquid outlet 312. Specifically, the lead-out pipe 42 is rotatably connected to the liquid outlet 312 through the elbow 43. For example, an operator who installs the ion exchange device 2 according to the present embodiment connects the elbow 43 to the liquid outlet 312 and rotates the elbow 43 to adjust the position of the elbow 43 in the circumferential direction. Then, the operator connects the lead-out pipe 42 to the liquid outlet 312 through the elbow 43 through the lead-out hole 351 formed in the pedestal 35. At this time, where the lead-out hole through which the lead-out pipe passes is circular, the operator sometimes cannot rotate the lead-out pipe that has passed through the lead-out hole in the directions of arrows A7 and A8 shown in FIGS. 5 and 9 and cannot connect the lead-out pipe to the elbow. Accordingly, the operator needs to readjust the position of the elbow 43 in the circumferential direction.

For this purpose, the lead-out hole 351 of the pedestal 35 of the present embodiment extends along the rotation direction of the lead-out pipe 42 (directions of arrows A7 and A8 shown in FIGS. 5 and 9). As a result, even when the pedestal 35 is fixed to the tubular body 31, and the lead-out pipe 42 is rotatably connected to the liquid outlet 312 through the elbow 43, the operator can connect and fix the lead-out pipe 42 to the liquid outlet 312 through the elbow 43 by using a portion of the lead-out hole 351 extending along the rotation direction of the lead-out pipe 42, rotating the lead-out pipe 42, and adjusting the position of the lead-out pipe 42.

The ion exchange resin bag 5 is detachably attached to the inside of the main body 3. That is, the ion exchange resin bag 5 can be inserted into the internal space 311 of the tubular body 31 and can be taken out of the internal space 311 of the tubular body 31 through the opening 317 of the tubular body 31. As shown in FIGS. 3 and 4, the ion exchange resin bag 5 can be brought into close contact with the inner wall 313 of the tubular body 31 in a state of being inserted into the internal space 311 of the tubular body 31. Details of this will be described hereinbelow.

Figure 12:
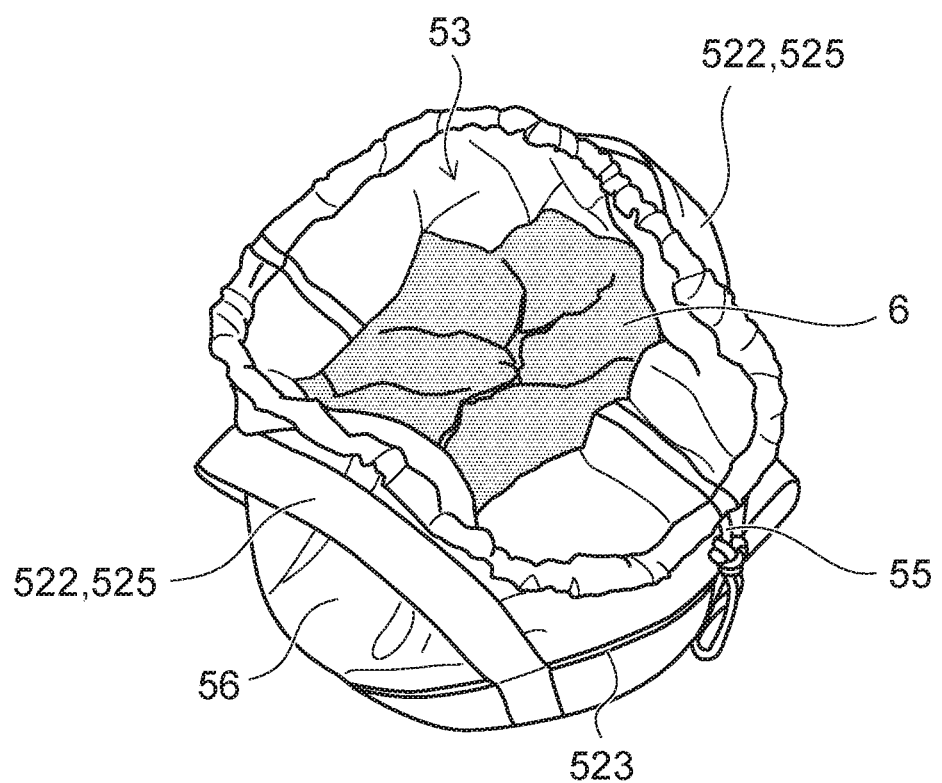
FIG. 12 is a perspective view showing an opening of the ion exchange resin bag according to the present embodiment.

The ion exchange resin bag 5 has a resin mesh and accommodates the ion exchange resin 6 (see FIG. 12). The capacity of the ion exchange resin 6 that can be accommodated in the ion exchange resin bag 5 is, for example, about 10 liters (L). However, the capacity of the ion exchange resin 6 that can be accommodated in the ion exchange resin bag 5 is not limited to this value.

In the ion exchange device 2 according to the present embodiment, a plurality of ion exchange resin bags 5 is provided in the internal space 311 of the tubular body 31. The plurality of ion exchange resin bags 5 are stacked inside the main body 3 (specifically, in the internal space 311 of the tubular body 31) along the flow direction of the ion exchange target liquid inside the main body 3. In the ion exchange device 2 shown in FIG. 3, four ion exchange resin bags 5 are provided. However, the number of ion exchange resin bags 5 is not limited to four and can be changed as appropriate.

Next, the flow of the ion exchange target liquid will be described. As indicated by arrows A9 and A11 shown in FIG. 4, for example, a machining liquid (ion exchange target liquid) guided from a machining liquid tank (not shown) of an electric discharge machine flows through the liquid introduction pipe 41 and is guided to the internal space 311 of the tubular body 31 through the liquid injection port 316 of the liquid injection portion 315. The machining liquid guided to the internal space 311 of the tubular body 31 passes through the ion exchange resin 6 accommodated in the ion exchange resin bags 5. As a result, ion exchange of the machining liquid by the ion exchange resin 6 is performed. As shown by the arrow A2 in FIG. 3, the machining liquid subjected to ion exchange passes through the liquid outlet port 314 of the liquid outlet 312, flows through the elbow 43 and the lead-out pipe 42, and is guided to the machining liquid tank of the electric discharge machine.

Here, the ion exchange resin has a life. That is, the ion exchange resin is replaced with a new ion exchange resin when a predetermined amount of ions is exchanged. Accordingly, the operator performs the operation of taking out the ion exchange resin bag that accommodates the ion exchange resin and has been put in the tubular body from the tubular body, and putting the ion exchange resin bag accommodating a new ion exchange resin into the tubular body. However, when ion exchange of the ion exchange target liquid is performed, the internal space of the tubular body is in a state of being filled with the ion exchange target liquid. It is difficult for an operator to take out the ion exchange resin bag from the tubular body in a state where the internal space of the tubular body is filled with the ion exchange target liquid. In addition, even if the ion exchange target liquid filled in the internal space of the tubular body is discharged to the outside of the tubular body, the ion exchange target liquid may flow backward from the outside of the tubular body into the internal space of the tubular body.

By contrast, with the ion exchange device main body according to the present embodiment, by injecting a gas such as air into the internal space 311 of the tubular body 31 from the gas injection port 325 of the gas injection portion 324 provided in the lid 32 when taking out the ion exchange resin bag 5 inserted into the internal space 311 of the tubular body 31, the operator makes it possible to discharge the ion exchange target liquid present in the internal space 311 of the body 31 to the outside of the tubular body 31 through the liquid outlet port 314 of the liquid outlet 312 provided in the tubular body 31. As a result, the operator can easily take out the ion exchange resin bag 5 in which the ion exchange resin 6 is accommodated from the internal space 311 of the tubular body 31. Further, as described above with reference to FIGS. 1 to 4, the lead-out pipe 42 that guides the ion exchange target liquid to the outside of the tubular body 31 is provided with the check valve 44 that prevents the ion exchange target liquid from flowing backward from the outside of the tubular body 31 into the internal space 311 of the tubular body 31. As a result, the ion exchange target liquid can be prevented from flowing backward from the outside of the tubular body 31 to the internal space 311 of the tubular body 31.

Further, the liquid injection portion 315 in which the liquid injection port 316 for injecting the ion exchange target liquid into the internal space 311 of the tubular body 31 is formed is provided in the tubular body 31 separately from the gas injection portion 324. Therefore, the operator can inject a gas such as air from the gas injection port 325 of the gas injection portion 324 to the internal space 311 of the tubular body 31 in a state in which the liquid introduction pipe 41 that guides the ion exchange target liquid to the internal space 311 of the tubular body 31 is being connected to the liquid injection portion 315. That is, when the operator injects the gas into the internal space 311 of the tubular body 31, the operator can inject the gas from the gas injection port 325 of the gas injection portion 324 into the internal space 311 of the tubular body 31 without pulling out the liquid introduction pipe 41 from the liquid injection portion 315. As a result, the operator can inject the gas into the internal space 311 of the tubular body 31 while suppressing the leakage of the ion exchange target liquid that occurs when the liquid introduction pipe 41 is pulled out of the liquid injection portion 315.

Further, the mesh 45 is provided on the downstream side of the check valve 44 in the lead-out pipe 42 and prevents the ion exchange resin 6 from flowing out of the lead-out pipe 42. As a result, even when the ion exchange resin bag 5 is torn and the ion exchange resin 6 accommodated in the ion exchange resin bag 5 comes out of the ion exchange resin bag 5, the mesh 45 blocks the ion exchange resin 6, and the ion exchange resin 6 is prevented from flowing out of the lead-out pipe 42. For example, in the case where the ion exchange device main body according to the present invention is an ion exchange device for an electric discharge machine that performs wire electric discharge machining or the like, the mesh can prevent the ion exchange resin from flowing out into the machining liquid tank of the electric discharge machine.

Further, the first lead-out pipe body 421 provided with the check valve 44 is connected to the liquid outlet 312. The second lead-out pipe body 422 provided with the mesh 45 is detachably connected to the first lead-out pipe body 421 on the downstream side of the check valve 44. Therefore, even if the ion exchange resin bag 5 is torn and the ion exchange resin 6 accommodated in the ion exchange resin bag 5 comes out of the ion exchange resin bag 5, the operator can easily recover the ion exchange resin 6 blocked by the mesh 45 and the ion exchange resin 6 remaining in the lead-out pipe 42 by detaching the second lead-out pipe body 422 from the first lead-out pipe body 421 without detaching the first lead-out pipe body 421 from the liquid outlet 312.

Where the support plate 47 (see FIG. 3) is provided at the lower end portion of the internal space 311 of the tubular body 31, the ion exchange target liquid present in the internal space 311 of the tubular body 31 is discharged to the outside of the tubular body 31 by the gas injected from the gas injection port 325 of the gas injection portion 324, and even if some ion exchange liquid remains on the bottom of the tubular body 31, the ion exchange resin bag 5 can be prevented from coming into contact with the ion exchange target liquid. As a result, the operator can easily take out the ion exchange resin bag 5 in which the ion exchange resin 6 is accommodated from the internal space 311 of the tubular body 31 in a state where the ion exchange target liquid is more reliably removed from the ion exchange resin bag 5 accommodating the ion exchange resin 6.

Next, the ion exchange resin bag 5 according to the present embodiment will be described in more detail with reference to the drawings.

Figure 10:
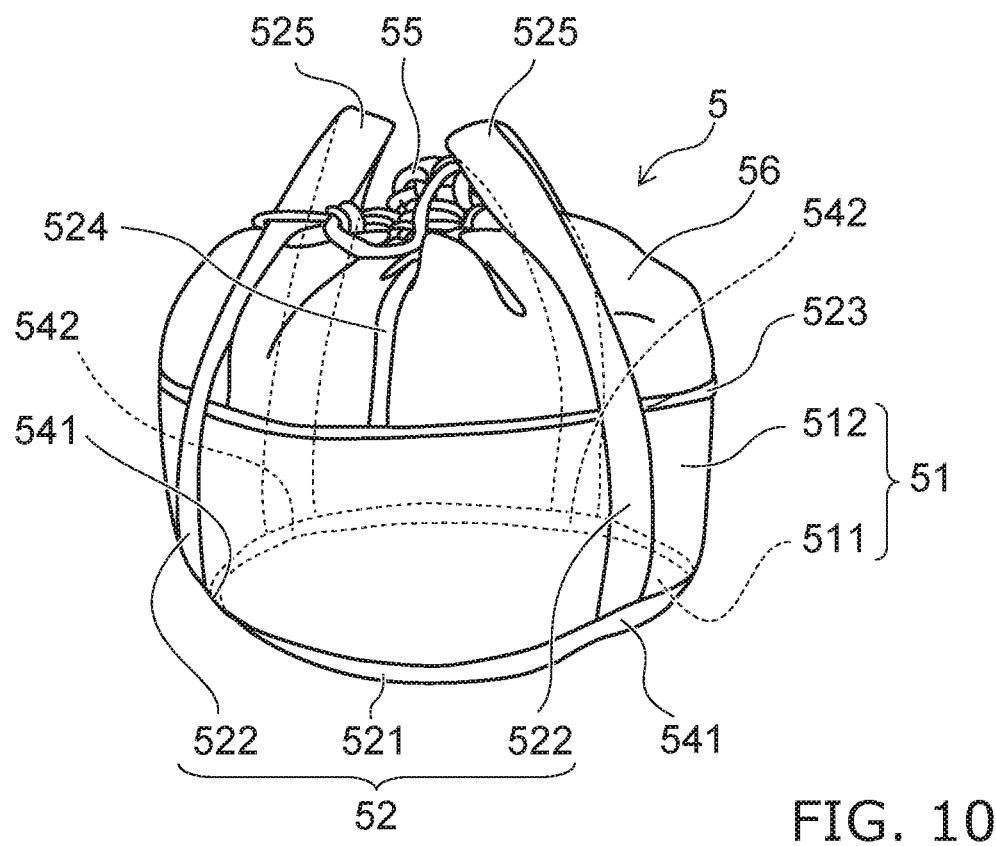
FIG. 10 is a perspective view of the ion exchange resin bag according to the present embodiment as viewed obliquely from above.

FIG. 10 is a perspective view of the ion exchange resin bag according to the present embodiment as viewed obliquely from above.

Figure 11:
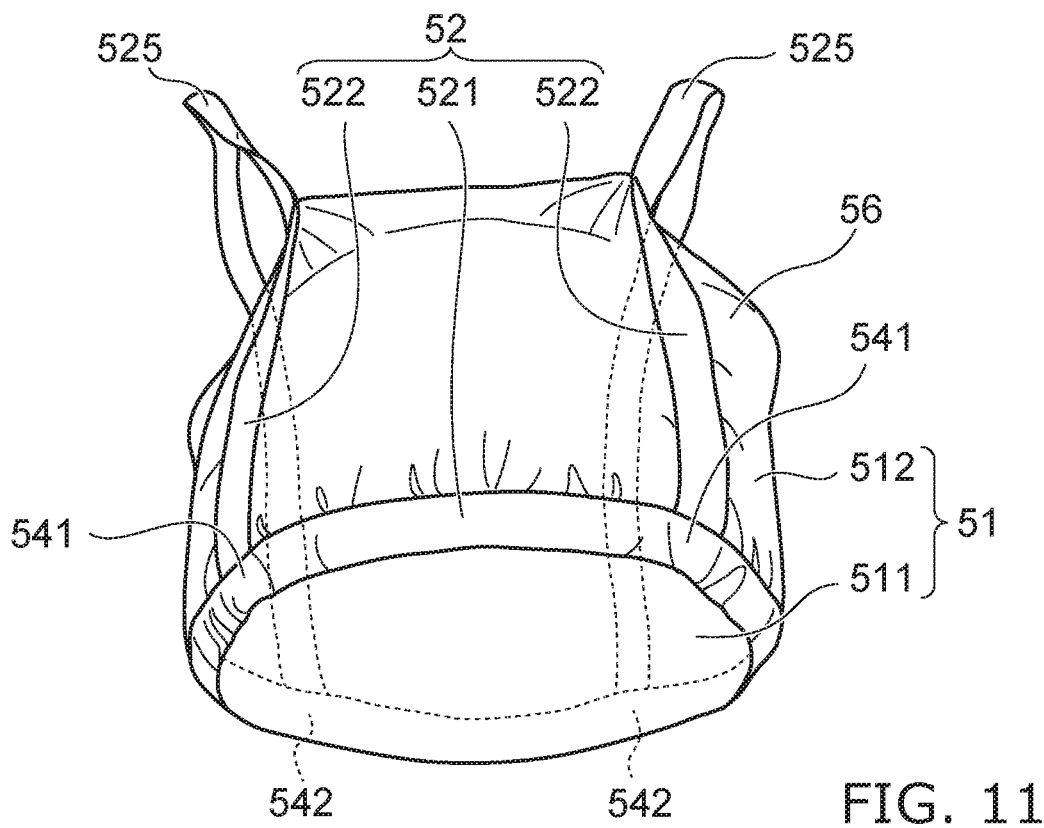
FIG. 11 is a perspective view of the ion exchange resin bag according to the present embodiment as viewed obliquely from below.

FIG. 11 is a perspective view of the ion exchange resin bag according to the present embodiment as viewed obliquely from below.

FIG. 12 is a perspective view showing the opening of the ion exchange resin bag according to the present embodiment.

The ion exchange resin bag 5 according to the present embodiment accommodates the ion exchange resin 6 (see FIG. 12) to be used in, for example, an ion exchange device of an electric discharge machine that performs wire electric discharge machining. An example of the ion exchange device is the ion exchange device 2 described above with reference to FIGS. 1 to 9. However, the ion exchange device in which the ion exchange resin bag 5 is used is not limited to the ion exchange device 2 described above with reference to FIGS. 1 to 9.

As shown in FIGS. 10 and 11, the ion exchange resin bag 5 according to the present embodiment includes a bag body 51 and a reinforcing body 52. The bag body 51 is formed of a resin mesh, has a bag shape, and accommodates the ion exchange resin 6. Specifically, the bag body 51 has a bottom surface portion 511 and a side surface portion 512. The bottom surface portion 511 is provided at the end portion opposite to the end portion where the opening 53 (see FIG. 12) is provided, and forms the bottom surface of the bag body 51. For example, the shape of the bottom surface portion 511 is a circle having a diameter of about 200 mm or more and 400 mm or less. However, this shape of the bottom surface portion 511 is not limiting. The side surface portion 512 is connected to the bottom surface portion 511 and forms the side surface of the bag body 51.

The operator can easily refill the ion exchange resin 6 through the opening 53 of the bag body 51. The opening 53 of the bag body 51 is provided with a closing means 55 for closing the opening 53. The closing means 55 of the present embodiment is, for example, a string. In other words, the bag body 51 of the present embodiment has a structure such as, for example, a drawstring bag. However, the closing means 55 is not limited to a string, and may be, for example, a binding band, an elastic band having an elastic body such as rubber, a chuck, and a hook-and-loop fastener. That is, the closing means 55 is not particularly limited as long as it has a structure capable of closing the opening 53 of the bag body 51. The operator can prevent the ion exchange resin 6 from leaking from the bag body 51 by closing the opening 53 with the closing means 55 after refilling the ion exchange resin 6 through the opening 53 of the bag body 51.

Examples of the resin for forming the bag body 51 include a resin including a polyester, a resin including nylon, a resin including polyethylene, a resin including Teflon (registered trademark), a resin including polypropylene, and a resin including polyether ether ketone (PEEK) and a resin including polyphenylene sulfide (PPS). The mesh opening of the mesh forming the bag body 51 is 28 μm or more and 195 μm or less. More preferably, the mesh opening of the mesh forming the bag body 51 is about 78 μm. Further, the mesh number of the mesh forming the bag body 51 is 86 mesh or more and 460 mesh or less. More preferably, the mesh number of the mesh forming the bag body 51 is about 196 mesh. The diameter of the ion exchange resin 6 accommodated in the bag body 51 is about 300 μm or more and 800 μm or less.

The reinforcing body 52 is provided on the bag body 51 and reinforces the bag body 51. The reinforcing body 52 is, for example, a band formed by knitting cloth or resin. Specifically, the reinforcing body 52 includes a first reinforcing portion 521 and a second reinforcing portion 522. The first reinforcing portion 521 is provided annularly and fixed at the boundary portion between the bottom surface portion 511 and the side surface portion 512 and reinforces the boundary portion between the bottom surface portion 511 and the side surface portion 512. The second reinforcing portion 522 is connected to the first reinforcing portion 521 and is fixed to at least a part of the side surface portion 512. Further, the second reinforcing portion 522 extends from the first reinforcing portion 521 toward the opening 53 of the bag body 51.

The second reinforcing portion 522 will be described hereinbelow more specifically. One end portion of the second reinforcing portion 522 is connected to a first connection portion 541 of the first reinforcing portion 521. The other end portion of the second reinforcing portion 522 (the end portion opposite to the one end portion) is connected to a second connection portion 542 of the first reinforcing portion 521. Here, the position of the first connection portion 541 is different from the position of the second connection portion 542. The second reinforcing portion 522 extends from the first connection portion 541 of the first reinforcing portion 521 toward the opening 53 of the bag body 51 while being fixed to the side surface portion 512 of the bag body 51, is separated once from the bag body 51 in the vicinity of the opening 53 of the bag body 51, and extends toward the second connection portion 542 of the first reinforcing portion 521 while being fixed again to the side surface portion 512 of the bag body 51. That is, the intermediate portions 525 of the one end portion (the portion connected to the first connection portion 541) of the second reinforcing portion 522 and the other end portion (the portion connected to the second connection portion 542) of the second reinforcing portion 522 are separated from the bag body 51. As a result, an annular space is formed between the second reinforcing portion 522 and the bag body 51. Therefore, when inserting the ion exchange resin bag 5 into the internal space 311 of the tubular body 31, or taking out the ion exchange resin bag 5 from the internal space 311 of the tubular body 31, the operator can grip the intermediate portions 525 of the second reinforcing portion 522 and can easily hold the ion exchange resin bag 5. In other words, the intermediate portion 525 of the second reinforcing portion 522 can function as a grip portion. As a result, the operator can easily perform the operation of replacing the ion exchange resin 6.

As shown in FIGS. 10 and 12, a third reinforcing portion 523 and a fourth reinforcing portion 524 may be further provided. The third reinforcing portion 523 is annularly provided and fixed to the outer peripheral portion of the side surface portion 512 of the bag body 51 on the opening 53 side as viewed from the first reinforcing portion 521. The fourth reinforcing portion 524 is fixed to the side surface portion 512 of the bag body 51 and extends from the third reinforcing portion 523 to the edge of the opening 53. That is, one end portion of the fourth reinforcing portion 524 is connected to the third reinforcing portion 523. The other end portion of the fourth reinforcing portion 524 is connected to the edge of the opening 53. As a result, the bag body 51 is further reinforced.

An identification means 56 for identifying the ion exchange resin bag 5 is provided on at least one surface of the bag body 51 and the reinforcing body 52. In the ion exchange resin bag 5 shown in FIGS. 10 to 12, the identification means 56 is provided on the surface of the bag body 51. The identification means 56 of any one ion exchange resin bag 5 among the plurality of ion exchange resin bags 5 is different from the identification means 56 of any other one ion exchange resin bags 5 among the plurality of ion exchange resin bags 5. For example, the identification means 56 is a color attached to the bag body 51. In this case, for example, the color (for example, white) of any one ion exchange resin bags 5 among the plurality of ion exchange resin bags 5 is different from the color (for example, purple) of any other one ion exchange resin bags 5 among the plurality of ion exchange resin bags 5. The identification means 56 is not particularly limited as long as the operator can identify the ion exchange resin bag 5. For example, the identification means may be a color attached to the reinforcing body 52, or a character, figure, symbol, and the like attached to the surface of at least any one of the bag body 51 and the reinforcing body 52. The operator can identify the plurality of ion exchange resin bags 5 from each other by visually recognizing the identification means 56.

Here, for example, in the case where the ion exchange resin bag is formed of a nonwoven fabric, where the ion exchange resin bag is inserted into the ion exchange device main body while accommodating the ion exchange resin, friction generated between the ion exchange resin bag and the inner wall of the ion exchange device main body is relatively large, which may cause wrinkles on the ion exchange resin bag or the shape of the ion exchange resin bag to collapse. In addition, even if the material of the ion exchange resin bag is chemical fibers, where the length of the ion exchange resin bag is relatively large (for example, of the same order as the length of the internal space of the ion exchange device main body), it may be difficult to put the ion exchange resin bag into the ion exchange device main body or to remove the ion exchange resin bag from the ion exchange device main body. In such a case, wrinkles may occur on the ion exchange resin bag or the shape of the ion exchange resin bag may collapse.

By contrast, with the ion exchange device 2 according to the present embodiment, the ion exchange resin bag 5 has a resin mesh, and therefore can be inserted into the main body 3 more smoothly as compared with an ion exchange resin bag formed of a nonwoven fabric or the like. Further, since the ion exchange resin 6 is accommodated in the plurality of ion exchange resin bags 5, the size of each ion exchange resin bag 5 can be reduced. Therefore, the contact area between the ion exchange resin bag 5 and the main body 3 is suppressed, and friction generated between the ion exchange resin bag 5 and the main body 3 is suppressed. As a result, the operator can easily insert the ion exchange resin bag 5 into the main body 3 or take the ion exchange resin bag out easily from the main body 3. As a consequence, the operator can easily perform the operation of replacing the ion exchange resin 6.

Further, since the size of each ion exchange resin bag 5 can be reduced, it is possible to prevent the ion exchange resin bag 5 from wrinkling and the shape of the ion exchange resin bag 5 from collapsing after the ion exchange resin bag 5 is inserted into the main body 3. Therefore, it is possible to suppress the occurrence of a gap between the ion exchange resin bag 5 and the main body 3. That is, the ion exchange resin bag 5 can be in close contact with the inner wall 313 of the main body 3 (specifically, the tubular body 31). Further, the plurality of ion exchange resin bags 5 are stacked inside the main body 3 (specifically, in the internal space 311 of the tubular body 31) along the flow direction of the ion exchange target liquid inside the main body 3. Therefore, the ion exchange target liquid flows substantially uniformly inside the main body 3 and also flows substantially uniformly inside the ion exchange resin bag 5. For this reason, the deterioration of the ion exchange resin 6 accommodated in the ion exchange resin bag 5 proceeds to the same degree throughout the resin. As a result, unevenness in the deterioration rate of the ion exchange resin 6 observed in transition to the inner region of the ion exchange resin bag 5 can be suppressed, and the life of the ion exchange resin 6 can be improved.

Further, the size of each ion exchange resin bag 5 can be reduced. For example, as described above with reference to FIGS. 5 to 9, the capacity of the ion exchange resin 6 that can be accommodated in the ion exchange resin bag is, for example, about 10 liters (L). Therefore, the capacity of the tubular body 31 can be increased while improving the workability of inserting and removing the ion exchange resin bag 5 to and from the tubular body 31. That is, for example, when an ion exchange resin of about half the capacity of the tubular body is directly inserted into the tubular body, where the ion exchange target liquid is introduced into the internal space of the tubular body, the ion exchange resin is stirred in the internal space of the tubular body by the flow of the ion exchange target liquid. Accordingly, for example, when the ion exchange resin includes a positive ion exchange resin (cation exchange resin) and a negative ion exchange resin (anion exchange resin), the cation exchange resin having a relatively low specific gravity is stacked on the upper side of the anion exchange resin having a relatively high specific gravity. That is, the cation exchange resin and the anion exchange resin are stacked while being separated from each other. As a result, the original functions of the ion exchange resin sometimes may not be achieved. Therefore, in general, when the ion exchange resin is inserted directly into the internal space of the tubular body, the ion exchange resin is inserted into the internal space of the tubular body so that most of the internal space of the tubular body is filled with the ion exchange resin in order to suppress the stirring of the ion exchange resin in the internal space of the tubular body. However, in this case, the main body in which the ion exchange resin is accommodated becomes heavy. For this reason, it is difficult to increase the capacity of the tubular body in consideration of transportation of the main body in which the ion exchange resin is accommodated. Further, when the capacity of the ion exchange resin bag is approximately the same as the capacity of the tubular body, the ion exchange resin bag in which the ion exchange resin is accommodated becomes heavy. For this reason, it is difficult to increase the capacity of the tubular body in consideration of the transportation of the ion exchange resin bag in which the ion exchange resin is accommodated. By contrast, the capacity of the ion exchange resin bag 5 according to the present embodiment is smaller than the capacity of the internal space 311 of the tubular body 31, and is, for example, about 10 liters (L). Therefore, the workability of inserting the ion exchange resin bag 5 in which the ion exchange resin 6 is accommodated into the tubular body 31 and removing the ion exchange resin bag from the tubular body 31 can be improved, and the capacity of the tubular body 31 can be increased while improving the workability of transporting the resin bag 5 in which the ion exchange resin 6 is accommodated.

In addition, in a state where the ion exchange resin 6 is accommodated in the ion exchange resin bag 5, it is possible to suppress stacking of the cation exchange resin and the anion exchange resin in a state where the resins are separated from each other. As a result, the life of the ion exchange resin 6 can be improved. The life of the ion exchange resin 6 can be also improved by manually kneading the ion exchange resin 6 accommodated in the ion exchange resin bag 5.

Not all of the ion exchange resins 6 accommodated in the plurality of ion exchange resin bags 5 need to be replaced with new ion exchange resins 6 at the same time. In other words, the ion exchange resin 6 accommodated in at least one ion exchange resin bag 5 of the plurality of ion exchange resin bags 5 may be replaced with a new ion exchange resin 6. For example, the operator may take out the ion exchange resin bag 5 arranged on the most downstream side of the flow of the ion exchange target liquid in the main body 3, among the plurality of ion exchange resin bags 5, from the main body 3 and replace the ion exchange resin 6 accommodated in this ion exchange resin bag 5 with a new ion exchange resin 6. As a result, the life of the ion exchange resin 6 can be further improved. Alternatively, the operator may change the mutual arrangement of the plurality of ion exchange resin bags 5 without replacing the ion exchange resin 6. For example, the operator may move the ion exchange resin bag 5 arranged on the most downstream side of the flow of the ion exchange target liquid inside the main body 3 to the most upstream side, and sequentially move other ion exchange resin bags 5 to the downstream side. As a result, the life of the ion exchange resin 6 can be further improved by changing the mutual arrangement of the plurality of ion exchange resin bags 5 along the flow direction of the ion exchange target liquid inside the main body 3.

Further, as described above, in the ion exchange device 2 according to the present embodiment, the plurality of ion exchange resin bags 5 are stacked along the flow direction of the ion exchange target liquid. Therefore, the mixing ratio of the negative ion exchange resin (cation exchange resin) and the positive ion exchange resin (anion exchange resin) contained in the ion exchange resin 6 may be different in the plurality of ion exchange resin bags 5. For example, in some ion exchange resin bags 5 among the plurality of ion exchange resin bags 5, the mixing ratio may be "anion exchange resin:cation exchange resin=50%:50%". Further, in other bags among the plurality of ion exchange resin bags 5, the mixing ratio may be "anion exchange resin:cation exchange resin=60%:40%". Then, the ion exchange resin bags 5 having a mixing ratio of "anion exchange resin:cation exchange resin=50%:50%" and ion exchange resin bags 5 having a mixing ratio of "anion exchange resin:cation exchange resin=60%:40%" may be alternately stacked in the main body 3 along the flow direction of the ion exchange target liquid. Alternatively, one ion exchange resin bag 5 having a mixing ratio of "anion exchange resin:cation exchange resin=50%:50%" may be stacked inside the main body 3 while being sandwiched between two ion exchange resin bags 5 having a mixing ratio of "anion exchange resin:cation exchange resin=60%:40%". Thus, in the ion exchange device 2 according to the present embodiment, the mixing ratio of the anion exchange resin and the cation exchange resin in one ion exchange resin bag 5 can be easily set and changed, and the overall mixing ratio of the ion exchange device 2 can be easily set and changed by combining a plurality of ion exchange resin bags 5 with mutually different mixing ratios.

Further, as described above, in the ion exchange resin bag 5 according to the present embodiment, the identification means 56 is provided on at least one surface of the bag body 51 and the reinforcing body 52. As a result, the operator can identify the mixing ratio of the anion exchange resin and the cation exchange resin accommodated in the arbitrary ion exchange resin bag 5 by visually recognizing the identification means 56. Alternatively, the operator may replace a part of the ion exchange resin 6 accommodated in the ion exchange resin bag 5 with a new ion exchange resin 6 and reuse the other part of the ion exchange resin 6. In this case, the operator can distinguish the ion exchange resin bag 5 in which the entire ion exchange resin 6 is replaced with a new ion exchange resin 6 from the ion exchange resin bag 5 in which part of the entire ion exchange resin 6 is reused by identifying the identification means 56.

Furthermore, with the ion exchange resin bag 5 according to the present embodiment, the bag body 51 is reinforced by the reinforcing body 52 having the first reinforcing portion 521 and the second reinforcing portion 522. Therefore, the shape of the ion exchange resin bag 5 can be maintained before and after insertion into the main body 3 (specifically, the tubular body 31). In other words, it is possible to prevent wrinkles and shape collapse of the ion exchange resin bag 5 after insertion into the main body 3. Here, the state in which "the shape can be maintained" in this specification means a state in which the shape is flexible and makes it possible to prevent wrinkles or shape collapse while deforming according to the internal structure of the main body (in this embodiment, the internal structure of the tubular body 31), rather than a state in which the shape is fixed or solidified. Therefore, the operator can easily insert the ion exchange resin bag 5 into the main body 3 or take the ion exchange resin bag out of the main body 3. Thereby, the operator can easily perform the operation of replacing the ion exchange resin 6.

Furthermore, since the ion exchange resin bag 5 can be prevented from wrinkling or shape collapse after being inserted into the main body 3, the occurrence of a gap between the ion exchange resin bag 5 and the main body 3 can be suppressed. That is, the ion exchange resin bag 5 can be in close contact with the inner wall 313 of the main body 3 (specifically, the tubular body 31) while maintaining the shape before and after being inserted into the main body 3. Therefore, the ion exchange target liquid flows substantially uniformly inside the main body 3. Therefore, the deterioration of the ion exchange resin 6 accommodated in the ion exchange resin bag 5 proceeds to the same degree throughout the resin. As a result, unevenness in the deterioration rate of the ion exchange resin 6 observed in transition to the inner region of the ion exchange resin bag 5 can be suppressed, and the life of the ion exchange resin 6 can be improved.

Further, where the resin forming the bag body 51 of the ion exchange resin bag 5 includes a polyester, the friction generated between the bag body 51 and the main body 3 is further suppressed. Thus, the operator can easily insert the ion exchange resin bag 5 into the main body 3 or take the ion exchange resin bag out of the main body 3.

When the mesh opening of the mesh forming the bag body 51 of the ion exchange resin bag 5 is 28 μm or more and 195 μm or less, and the number of meshes is 86 mesh or more and 460 mesh or less, mesh clogging can be suppressed. As a result, the ion exchange target liquid passes through the ion exchange resin 6 and the bag body 51 smoothly and substantially uniformly. That is, water permeability (drainage or drainage performance) with respect to the ion exchange resin 6 and the bag body 51 can be improved. As a result, unevenness in the deterioration rate of the ion exchange resin 6 observed in transition to the inner region of the ion exchange resin bag 5 can be suppressed, and the life of the ion exchange resin 6 can be improved. Further, since the amount of water contained in the ion exchange resin 6 and the bag body 51 can be suppressed, the operator can easily take out the ion exchange resin bag 5 from the main body 3.

The embodiments of the present invention have been described above. However, the present invention is not limited to the above-described embodiments, and various modifications can be made without departing from the scope of the claims. Parts of the configuration of the above embodiments can be omitted or can be arbitrarily combined so as to be different from the above.

REFERENCE SIGNS LIST

2 Ion exchange device
3 Ion exchange device main body
5 Ion exchange resin bag
6 Ion exchange resin
31 Tubular body
32 Lid
33 Hinge
34 Lock portion
35 Pedestal
36 Clamp
41 Liquid introduction pipe
42 Lead-out pipe
43 Elbow
44 Check valve
45 Mesh
46 Gas introduction pipe
47 Support plate
51 Bag body
52 Reinforcing body
53 Opening
55 Closing means
56 Identification means
311 Inner space
312 Liquid outlet
313 Inner wall
314 Liquid outlet port
315 Liquid injection portion
316 Liquid injection port
317 Opening
318 O-ring
321 Handle
324 Gas injection portion
325 Gas injection port
326 Gas outlet
327 Gas outlet port
331 First hinge body
332 Second hinge body
333 Shaft
334 Stopper
342, 343 Shaft
351 Lead-out hole
355 Hole
411 Check valve
421 First lead-out pipe body
422 Second lead-out pipe body
461 Adjustment valve
462 Check valve
471 Liquid passage hole
511 Bottom portion
512 Side portion
521 First reinforcing portion
522 Second reinforcing portion
523 Third reinforcing portion
524 Fourth reinforcing portion
525 Middle portion
541 First connection portion
542 Second connection portion

The invention claimed is:

1. An ion exchange resin bag accommodating an ion exchange resin to be used in an ion exchange device, the ion exchange resin bag comprising:
   a bag body that is formed of a resin mesh, has a bag shape, and accommodates the ion exchange resin; and
   a reinforcing body provided in the bag body and reinforcing the bag body, wherein the bag body has
      a bottom surface portion that is provided at an end portion opposite to an end portion where an opening is provided and forms a bottom surface of the bag body, and
      a side surface portion that is connected to the bottom surface portion and forms a side surface of the bag body; and
   the reinforcing body has
      a first reinforcing portion that is fixed to a boundary portion between the bottom surface portion and the side surface portion to reinforce the boundary portion, and
      a second reinforcing portion that is connected to the first reinforcing portion and fixed to at least a part of the side surface portion and extends from the first reinforcing portion toward the opening without passing over the bottom surface portion, wherein the second reinforcing portion is connected, at one end portion, to a first connection portion of the first reinforcing portion and is connected, at the other end portion on the side opposite to the first end portion, to a second connection portion of the first reinforcing portion at a position different from the position of the first connection portion.

2. The ion exchange resin bag according to claim 1, wherein
   an intermediate portion between the one end portion and the other end portion serves as a grip portion that can be gripped.

3. The ion exchange resin bag according to claim 1, wherein the resin is a resin including a polyester.

4. The ion exchange resin bag according to claim 1, wherein the mesh opening of the mesh is 28 μm or more and 195 μm or less, and the mesh number of the mesh is 86 mesh or more and 460 mesh or less.

5. The ion exchange resin bag according to claim 1, further comprising
   closing means that is provided in the opening of the bag body and closes the opening.

6. The ion exchange resin bag according to claim 1, wherein at least either one of the bag body and the reinforcing body has identification means for discriminating between a certain ion exchange resin bag and another ion exchange resin bag.

7. The ion exchange resin bag according to claim 5, wherein the closing means comprises a string, a band, a chuck, or a fastener.

8. The ion exchange resin bag according to claim 1, wherein
   the end portion of the bag body at which the opening is provided is defined as a top surface portion of the bag body,
   the second reinforcing portion is in a strip shape having two ends wherein one of the two ends is defined as the one end portion that is connected to the first connection portion, and the other of the two ends is defined as the other end portion that is connected to the second connection portion,
   the second reinforcing portion further includes two fixed portions wherein
      one of the two fixed portions, which is defined as a first fixed portion, extends from the first connection portion facing the side surface portion such that the first fixed portion is fixed to the side surface portion,
      the other of the two fixed portions, which is defined as a second fixed portion, extends from the second connection portion facing the side surface portion such that the second fixed portion is fixed to the side surface portion,
   an intermediate portion of the second reinforcing portion that intervenes between the first and second fixed portions is placed over the top surface portion, not being fixed to the top surface portion, such that the intermediate portion serves as a grip that can be gripped by an operator, and
   none of the second reinforcing portion is placed over the bottom surface portion.

9. The ion exchange resin bag according to claim 8, wherein
   the first fixed portion is entirely fixed to the side surface portion, and
   the second fixed portion is entirely fixed to the side surface portion.

10. The ion exchange resin bag according to claim 8, further comprising:
   another second reinforcing portion that is identical to the second reinforcing portion, and
   the second reinforcing portion and the another second reinforcing portion are arranged in parallel on the side surface portion, not intersecting each other.

* * * * *